(12) United States Patent
You et al.

(10) Patent No.: US 11,705,605 B2
(45) Date of Patent: Jul. 18, 2023

(54) BATTERY MODULE AND INSULATING PLATE

(71) Applicant: CONTEMPORARY AMPEREX TECHNOLOGY CO., LIMITED, Fujian (CN)

(72) Inventors: Zhiyi You, Fujian (CN); Hua Zhang, Fujian (CN); Feng Qin, Fujian (CN); Liangmei Chen, Fujian (CN); Liangyi Wang, Fujian (CN); Runyong He, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 272 days.

(21) Appl. No.: 17/145,286

(22) Filed: Jan. 9, 2021

(65) Prior Publication Data

US 2021/0135319 A1    May 6, 2021

Related U.S. Application Data

(63) Continuation of application No. PCT/CN2020/085394, filed on Apr. 17, 2020.

(30) Foreign Application Priority Data

Jun. 28, 2019 (CN) ..................... 201921002498.X

(51) Int. Cl.
*H01M 50/507* (2021.01)
*H01M 50/207* (2021.01)
*H01M 50/593* (2021.01)

(52) U.S. Cl.
CPC ....... *H01M 50/507* (2021.01); *H01M 50/207* (2021.01); *H01M 50/593* (2021.01)

(58) Field of Classification Search
CPC . H01M 50/507; H01M 50/207; H01M 50/593
See application file for complete search history.

(56) References Cited

U.S. PATENT DOCUMENTS

2007/0141457 A1   6/2007  Amagai
2019/0067656 A1   2/2019  Zhang et al.

FOREIGN PATENT DOCUMENTS

CN    204857837 U  * 12/2015
CN    207183361 U    4/2018
(Continued)

OTHER PUBLICATIONS

Translation CN204857837 (Year: 2015).*
Translation CN109888159 (Year: 2019).*

*Primary Examiner* — Jane J Rhee
(74) *Attorney, Agent, or Firm* — Scully, Scott, Murphy & Presser, P.C.

(57) ABSTRACT

The present application relates to a battery module. The battery module includes a battery group and an insulating plate. The battery group includes a bus bar and a plurality of battery units, each battery unit includes a tab which includes a connecting segment and a bending segment. The insulating plate includes a plurality of plate assemblies, and the adjacent plate assemblies are connected through a connecting plate. There is an obtuse angle between each plate assembly and the connecting plate connected thereto. Each connecting segment passes through a guiding groove, and the bending segment and the bus bar are fixed and connected. The guiding groove can adjust the altitude of the tab as it passes through the insulating plate. The bending segment can be connected to the bus bar, then the process requirements can be met with a small space, which improves the energy density of the battery module.

20 Claims, 6 Drawing Sheets

(56) References Cited

FOREIGN PATENT DOCUMENTS

| | | | |
|---|---|---|---|
| CN | 108428852 | A | 8/2018 |
| CN | 208028106 | U | 10/2018 |
| CN | 109888159 | A * | 6/2019 |
| CN | 110380112 | A | 10/2019 |
| CN | 209822772 | U | 12/2019 |
| EP | 1798787 | A2 | 6/2007 |

* cited by examiner

BATTERY MODULE AND INSULATING PLATE

CROSS-REFERENCE TO RELATED APPLICATIONS

This application is a continuation of International Application No. PCT/CN2020/085394, filed on Apr. 17, 2020, which claims priority to Chinese Patent Application No. 201921002498.X, filed on Jun. 28, 2019. The disclosures of the aforementioned applications are hereby incorporated by reference in their entireties.

TECHNICAL FIELD

The present application relates to the field of energy storage devices, and in particular to a battery module and an insulating plate.

BACKGROUND

An energy storage system of a new energy vehicle is a large-capacity battery group composed of a plurality of battery units connected in series or in parallel. The series-parallel structure of the battery group is mainly connected by a bus bar to realize the pooling of currents.

Each battery unit in the battery group includes two tabs, namely, a positive tab and a negative tab. When the battery units are connected in parallel, usually a plurality of positive tabs are connected to a positive bus bar and a plurality of negative tabs are connected to a negative bus bar.

In related art, the battery module also includes an insulating plate; after passing through the insulating plate, the tab is adjusted regarding the position and altitude before being connected to the bus bar to ensure stable flow. However, the insulating plate in the related art usually prone to damage to the battery group.

SUMMARY

The present application is provided with a battery module and an insulating plate to solve technical problems in related art and increase the energy density of the battery module.

The present application provides a battery module, including: a battery group and an insulating plate.

The battery group includes a bus bar and a plurality of battery units, each battery unit includes a tab; and the bus bar is fixed at one side of the insulating plate away from the battery group.

The insulating plate includes a plurality of plate assemblies, the adjacent plate assemblies are connected through a connecting plate; and there is an obtuse first angle between each plate assembly and the connecting plate connected thereto.

The plate assembly includes a guiding groove, and each tab passes through the guiding groove and is fixed and connected to the bus bar.

In some embodiments, each plate assembly includes a first plate and a second plate.

The guiding groove is disposed at a junction of the first plate and the second plate.

In some embodiments, there is an obtuse second angle between the first plate and the second plate.

In some embodiments, the tab includes a connecting segment and a bending segment which are integrally formed.

The connecting segment passes through the guiding groove, and the bending segment is fixed and connected to the bus bar.

In some embodiments, face-to-face attachment fixing is formed between the bending segment and the bus bar.

In some embodiments, a buckle is disposed at one side of the insulating plate away from the battery group.

The bus bar is snap-fitted and fixed to the buckle.

In some embodiments, the insulating plate includes a first insulating plate and a second insulating plate.

The first insulating plate and the second insulating plate are disposed at two ends of the battery group along a lengthwise direction.

The tab includes a first tab and a second tab.

A connecting segment of each first tab passes through the guiding groove of the first insulating plate.

A connecting segment of each second tab passes through the guiding groove of the second insulating plate.

In some embodiments, the bus bar includes a first bus bar and a second bus bar.

A bending segment of each first tab is fixed and connected to the first bus bar.

A bending segment of each second tab is fixed and connected to the second bus bar.

In some embodiments, the connecting segment extends along the lengthwise direction of the battery group.

The bending segment extends along a widthwise direction of the battery group.

In some embodiments, the battery module further includes a lower box body.

An inner wall of the lower box body is provided with a slot.

The battery group, the insulating plate and the bus bar are all disposed in the lower box body.

Two ends of the insulating plate are provided with an extending portion; and the extending portion is snap-fitted and fixed to the slot.

The technical solution provided by this application can achieve the following beneficial effects.

The present application provides a battery module, including a battery group and an insulating plate. The battery group includes a bus bar and a plurality of battery units, each battery unit includes a tab, and the bus bar is fixed at one side of the insulating plate away from the battery group. The insulating plate includes a plurality of plate assemblies, the adjacent plate assemblies are connected through a connecting plate. There is an obtuse angle between each plate assembly and the connecting plate connected thereto. The plate assembly includes a guiding groove, and each tab passes through the guiding groove and is fixed and connected to the bus bar. The guiding groove can adjust the altitude of the tab as it passes through the insulating plate, facilitating the passage of the tab. By providing the connecting plate, there is an obtuse angle between the plate assembly and the connecting plate, and a sharp-angled portion between the plate assembly and the plate assembly in the related art is eliminated, which not only avoids damage to the battery group, but also increases the internal space of the battery module and improves the energy density of the battery module.

The present application provides an insulating plate, wherein the insulating plate is disposed between a bus bar and a battery group, the insulating plate includes a plurality of plate assemblies, the adjacent plate assemblies are connected through the connecting plate; and there is an obtuse first angle between each plate assembly and the connecting plate connected thereto.

The plate assembly includes a guiding groove, and each tab passes through the guiding groove and is fixed and connected to the bus bar.

The present application provides a vehicle, including a battery module, wherein the battery module includes a battery group and an insulating plate.

The battery group includes a bus bar and a plurality of battery units, each battery unit comprises a tab; and the bus bar is fixed at one side of the insulating plate away from the battery group.

The insulating plate includes a plurality of plate assemblies, the adjacent plate assemblies are connected through a connecting plate; and there is an obtuse first angle between each plate assembly and the connecting plate connected thereto.

The plate assembly comprises a guiding groove, and each tab passes through the guiding groove and is fixed and connected to the bus bar.

It should be understood that, the foregoing general description and the coming detailed description are merely exemplary and cannot limit the present application.

BRIEF DESCRIPTION OF DRAWINGS

In order to illustrate the embodiments of the present application and the technical solutions in related art more clearly, brief description will be made below to the accompanying drawings required in the embodiments of the present application or the technical solutions in the related art, and apparently, the accompanying drawings described below are some embodiments of the present application, and other accompanying drawings could be obtained based on these drawings by those skilled in the art without creative efforts.

REFERENCE SIGNS

1—battery module;
11—battery group;
111—battery unit;
111a—tab;
111a1—connecting segment;
111a2—bending segment;
111b—first tab;
111c—second tab;
112—bus bar;
12—insulating plate;
121—guiding groove;
122—plate assembly;
122a—first plate;
122b—second plate;
123—connecting plate;
124—buckle;
125—extending portion;
126—first insulating plate;
127—second insulating plate;
13—lower box body;
131—slot;
14—upper cover;
15—thermally conductive structure adhesive;
16—filing layer;
17—sampling member;
α—second angle; and
β—first angle.

The accompanying drawings herein are incorporated into the description and form a part of the description, show embodiments conforming to the present application, and are used together with description to explain the principle of the present application.

DESCRIPTION OF EMBODIMENTS

Now the technical solutions in embodiments of the present application will be clearly and completely described below with reference to the accompanying drawings. Apparently, the described embodiments are some of, rather than all of, the embodiments of the present application. All the other embodiments obtained by those skill in the art based on the embodiments of the present application without any inventive effort shall fall within the scope of protection of the present application.

The insulating plate in the related art usually includes a sharp-angled structure, which is not only prone to damage to the battery group, but also occupies a space inside the battery module and reduce the energy density of the battery module.

Figure 1:
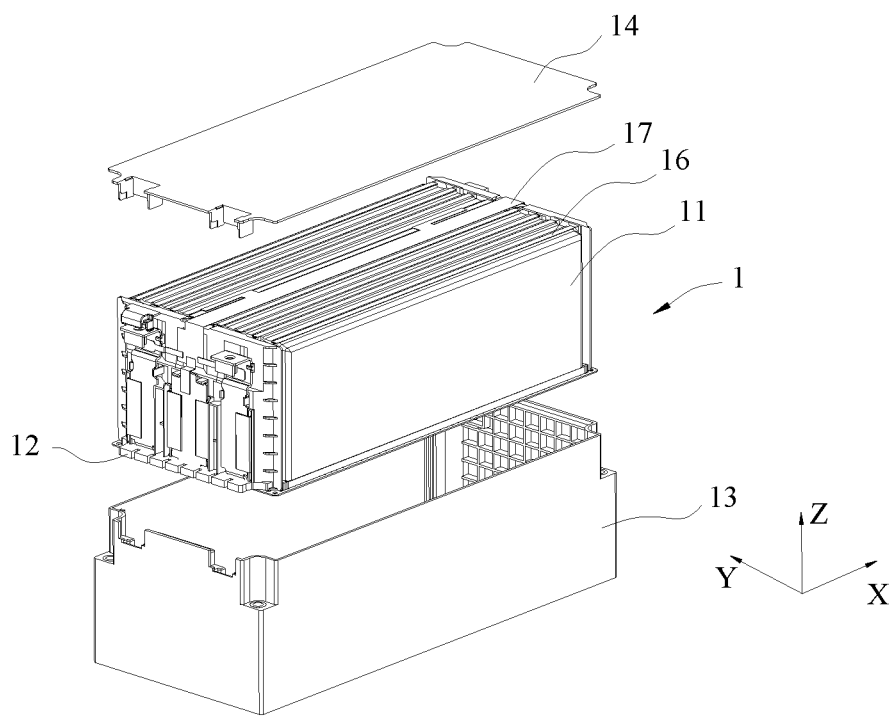
FIG. 1 is an exploded structural view of the battery module according to an embodiment of the present application.
Figure 2:
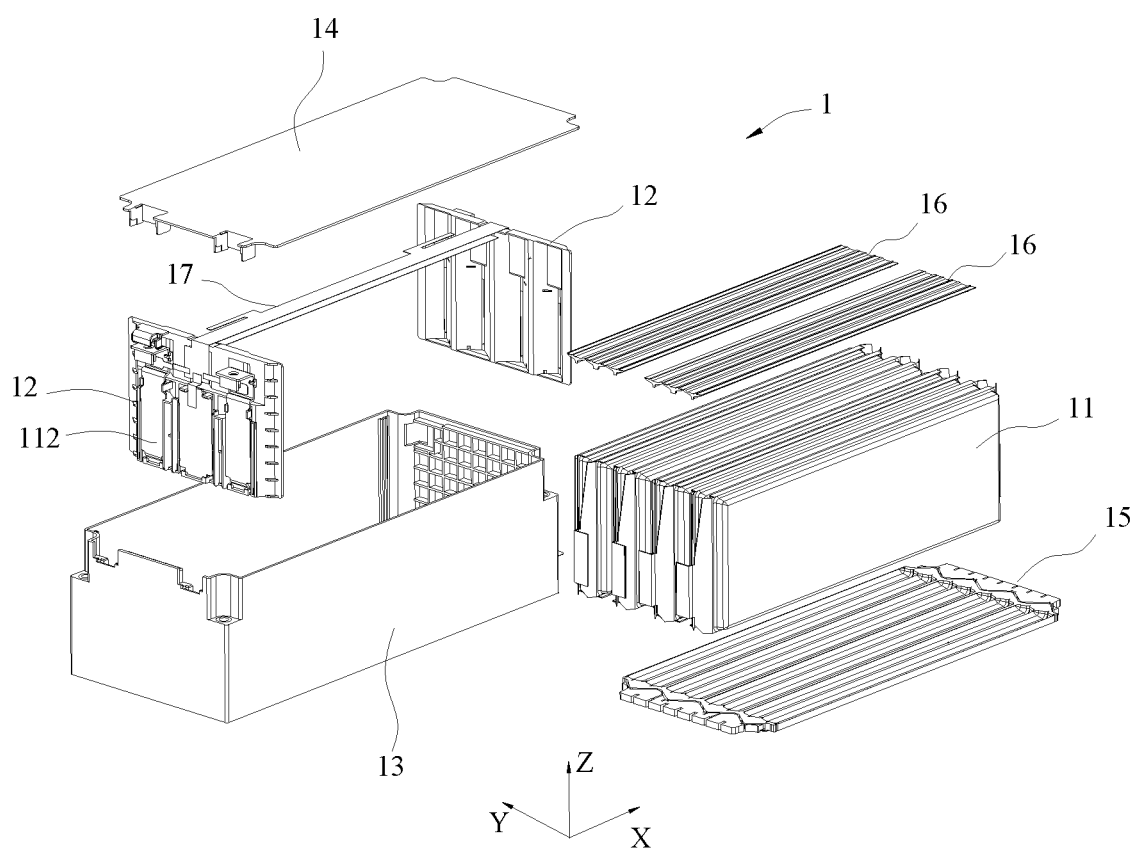
FIG. 2 is a further exploded schematic structural diagram of the battery module according to an embodiment of the present application.

FIG. 1 is an exploded structural view of the battery module according to an embodiment of the present application, and FIG. 2 is a further exploded schematic structural diagram of the battery module according to an embodiment of the present application. As shown in FIG. 1, the embodiments of the present application provide a battery module 1, including a battery group 11 and an insulating plate 12, where the battery module 1 may further include a lower box body 13 and an upper cover 14. The battery group 11 is formed with a plurality of batter units 111 (with reference to FIG. 5) connected in series or parallel, and the battery group 11 is accommodated in an accommodating space between the lower box body 13 and the upper cover 14.

As shown in FIG. 2, a thermally conductive structural adhesive 15 may be disposed between the battery group 11 and the lower box body 13 so as to dissipate the heat of the battery group 11. The thermally conductive structural adhesive 15 can also play a role as a buffer, avoiding a short circuit of the battery group 11 because of the less evenness of the lower box body 13. A filing layer 16 can be disposed between the battery group 11 and the upper cover 14, thereby separating the battery group 11 and the upper cover 14.

Figure 3:
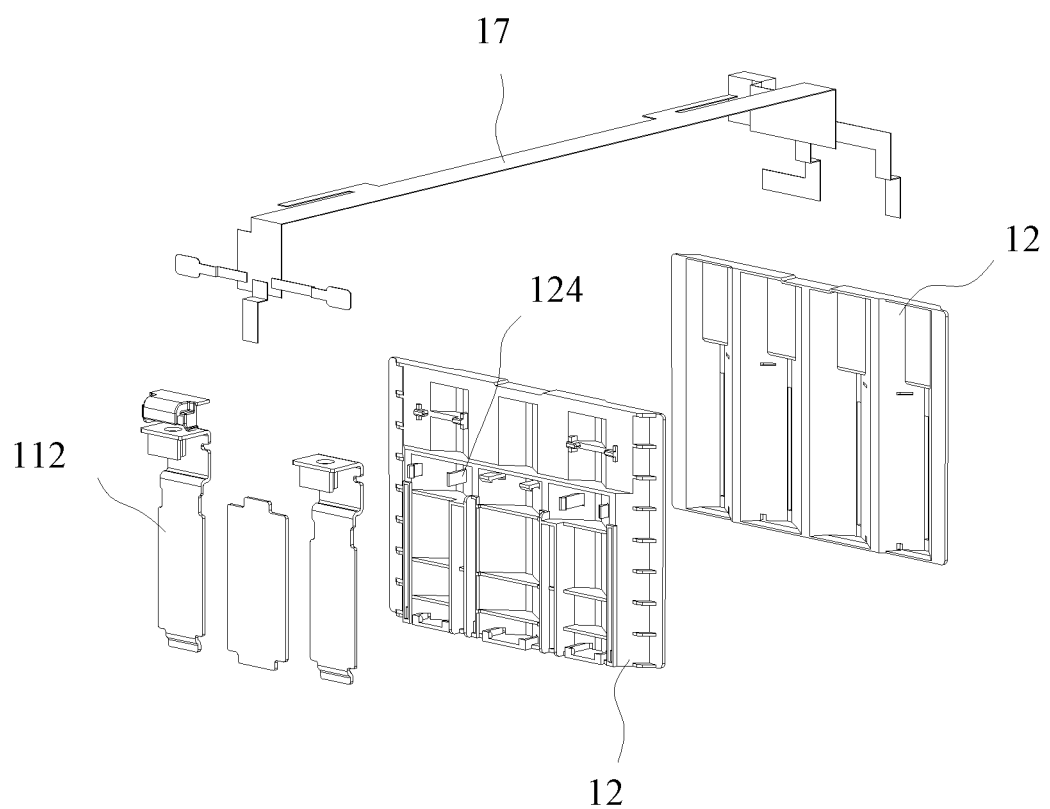
FIG. 3 is a schematic diagram of the connecting relationship of the insulating plate, the bus bar and the sampling member.
Figure 4:
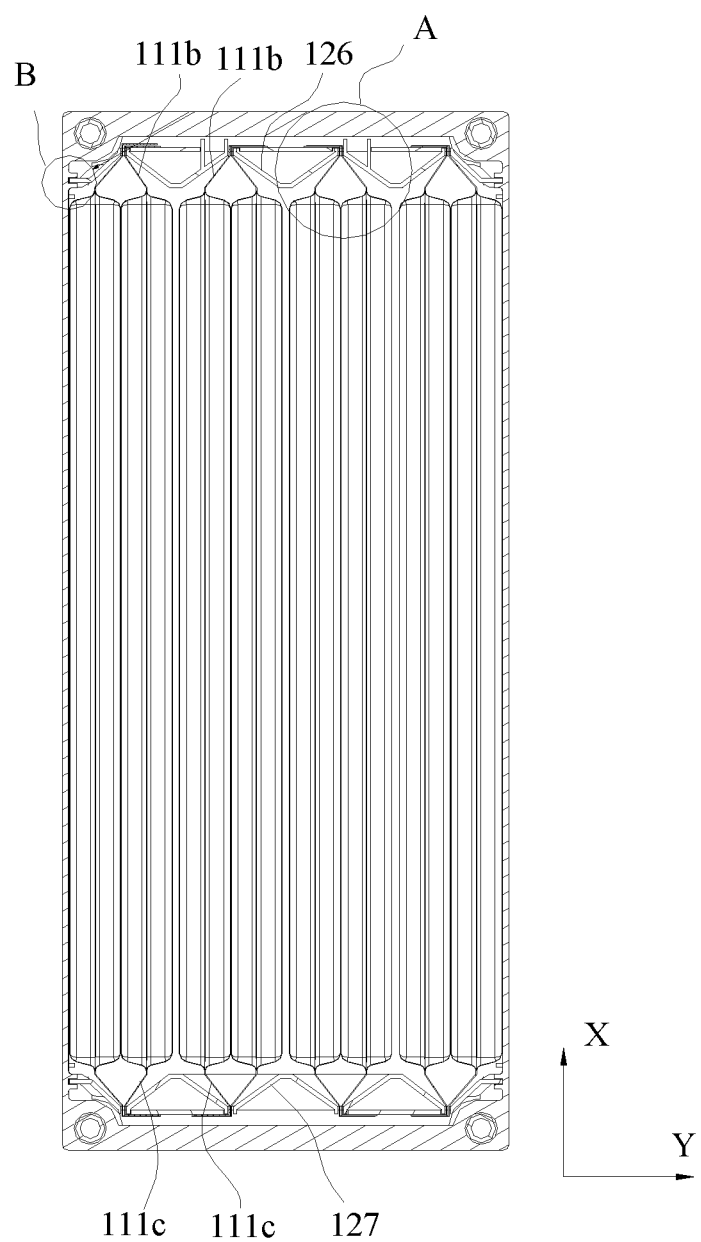
FIG. 4 is a sectional view of the battery module according to an embodiment of the present application.

The insulating plate 12 may include a first insulating plate 126 and a second insulating plate 127 (as shown in FIG. 4) disposed oppositely along a lengthwise direction of the battery group 11 (the direction X in FIG. 1). The first insulating plate 126 and the second insulating plate 127 are disposed respectively at two sides of the battery group 11 along the lengthwise direction (the direction X in FIG. 1). FIG. 3 is a schematic diagram of the connecting relationship of the insulating plate, the bus bar and the sampling member. With reference to FIG. 2 and FIG. 3 at the same time, a sampling member 17 may be located at a top end of the battery group 11 and electrically connected to a bus bar 112, used to sample temperature and voltage of the battery group 11 to monitor the working state of the battery group 11.

Figure 5:
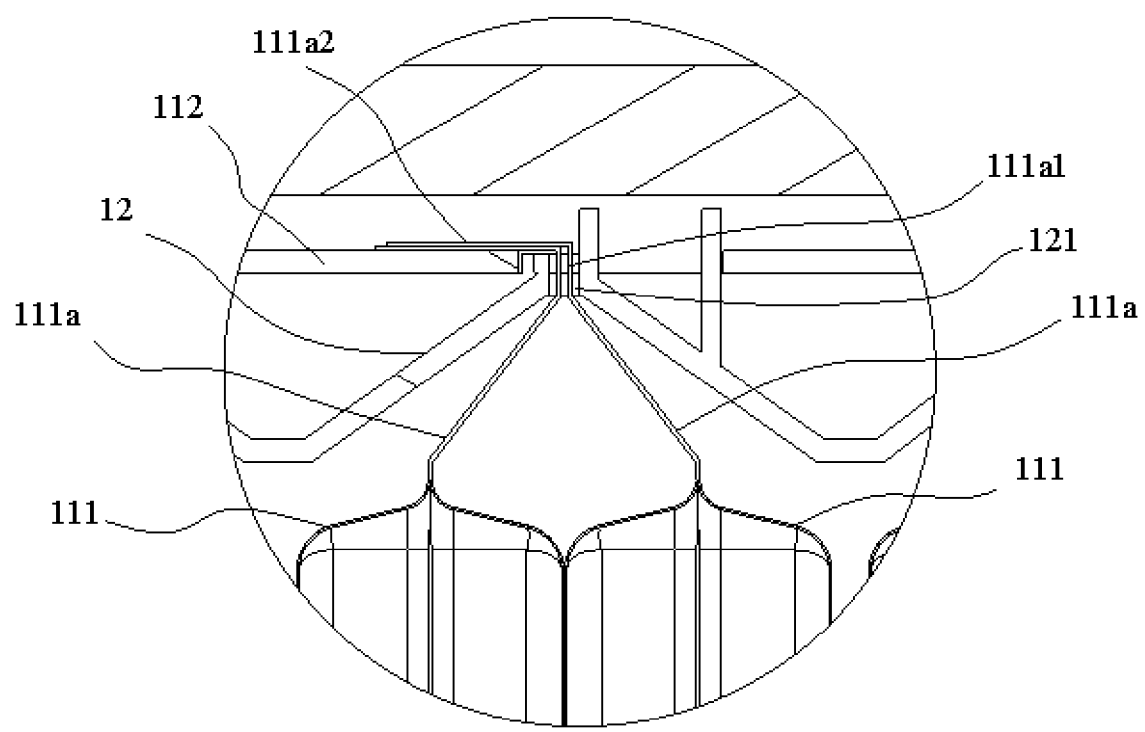
FIG. 5 is an enlarged view of the point A in FIG. 4.
Figure 6:
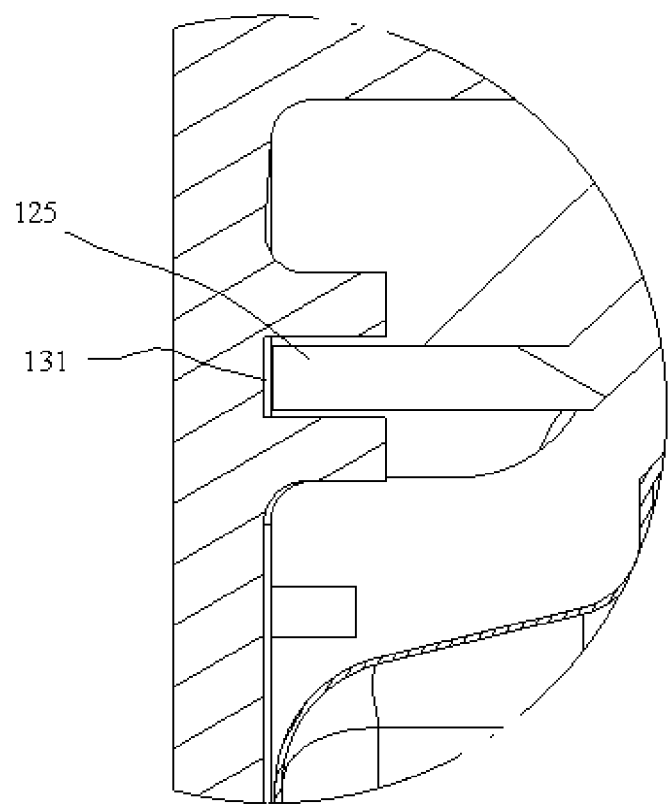
FIG. 6 is an enlarged view of the point B in FIG. 4.
Figure 7:
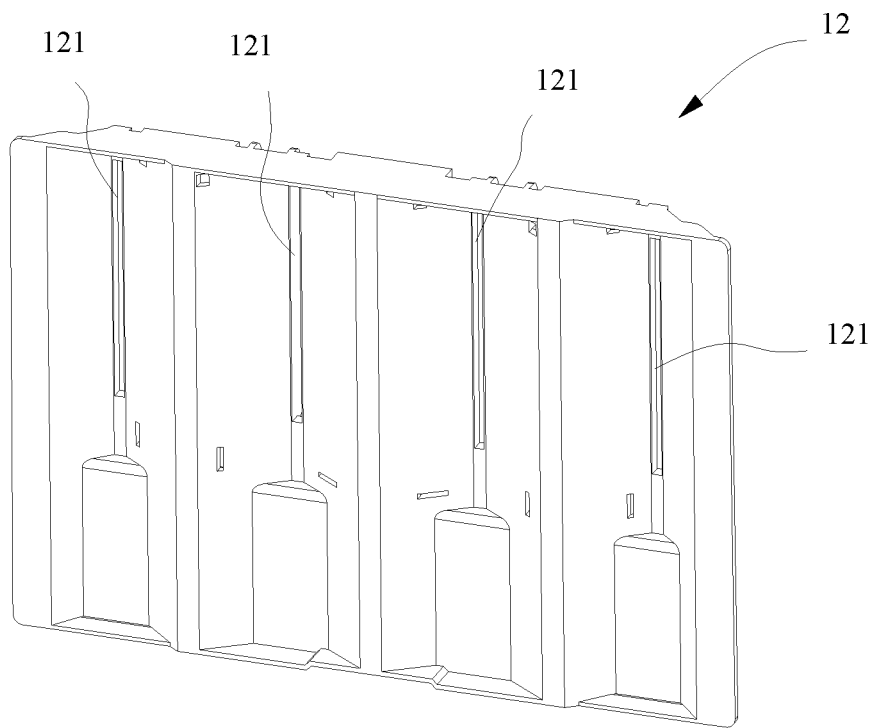
FIG. 7 is a structural schematic diagram of the insulating plate.
Figure 8:
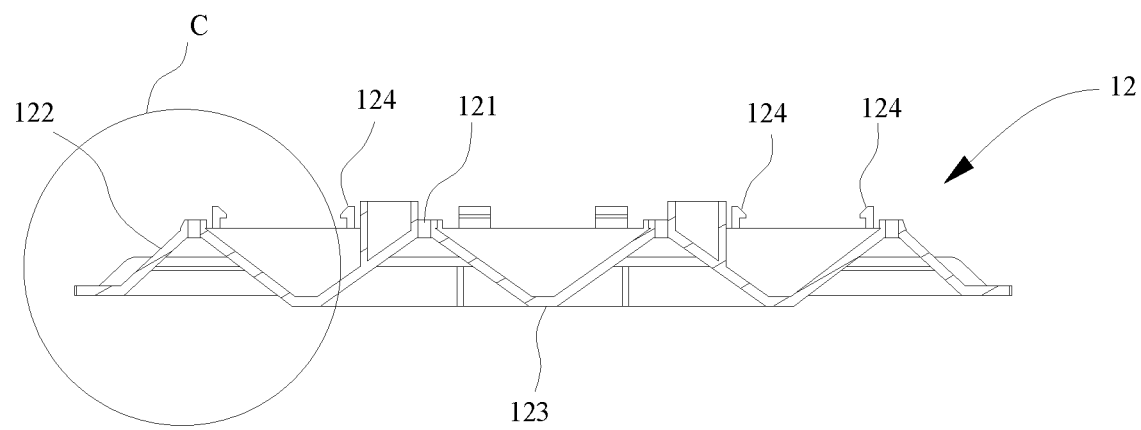
FIG. 8 is a cross-section view of the insulating plate.
Figure 9:
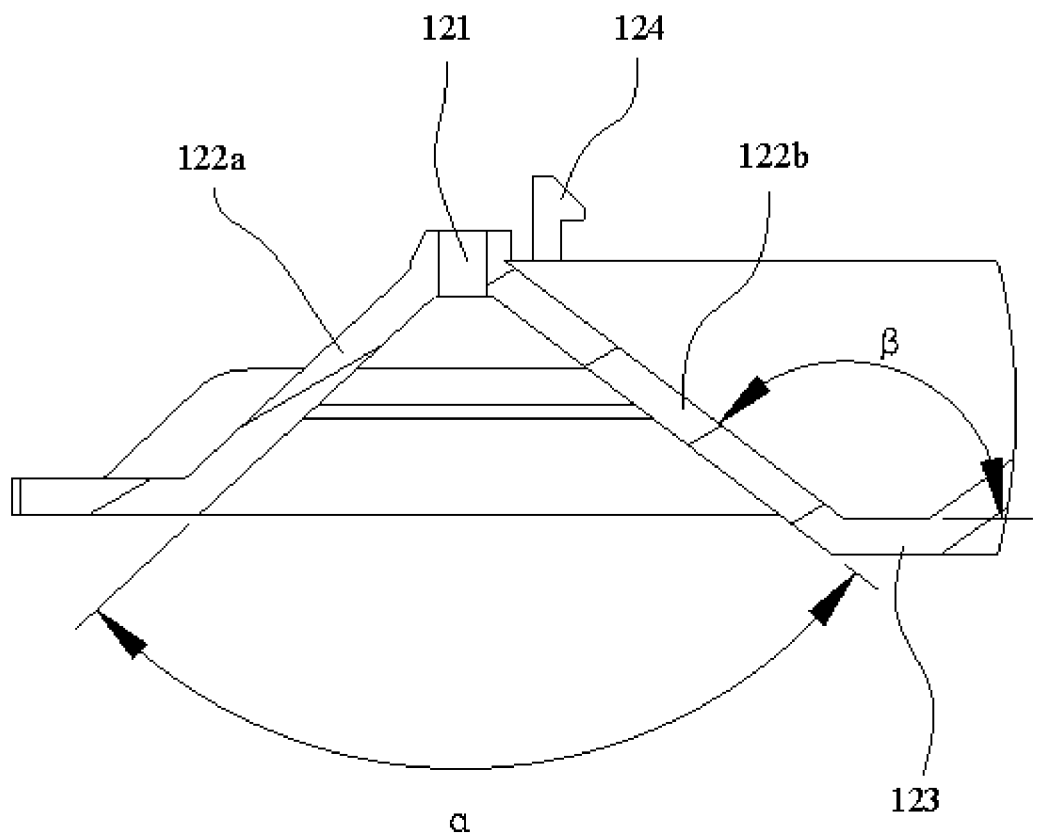
FIG. 9 is an enlarged view of the point C in FIG. 8.

FIG. 4 is a sectional view of the battery module according to an embodiment of the present application; FIG. 5 is an enlarged view of the point A in FIG. 4; FIG. 6 is an enlarged view of the point B in FIG. 4; FIG. 7 is a structural schematic diagram of the insulating plate; FIG. 8 is a cross-section view of the insulating plate; and FIG. 9 is an enlarged view of the point C in FIG. 8.

As shown in FIG. 4 to FIG. 9, the battery group 11 includes a bus bar 112 and a plurality of battery units 111, and the bus bar 112 is fixed at one side of the insulating plate 12 away from the battery group 11, and may be connected to the sampling member 17 (with reference to FIG. 3).

Each battery unit 111 includes a tab 111a, and the tab 111a includes a first tab 111b and a second tab 111c, implementing energy output of the battery group 11. Among them, exemplarily, the first tab 111b may be a positive tab and the second tab 111c may be a negative tab. Or the first tab 111b may be a negative tab and the second tab 111c may be a positive tab, which is not limited herein.

The structure of the first tab 111b and the second tab 111c may be same, and both of which include a connecting segment 111a1 and a bending segment 111a2. The insulating plate 12 includes a guiding groove 121, and each tab 111a passes through the guiding groove 121 and is fixed and connected to the bus bar 112.

In some embodiments, each tab includes a connecting segment 111a1 and a bending segment 111a2 which are integrally formed. Each connecting segment 111a1 passes through the guiding groove 121, and the bending segment 111a2 is fixed and connected to the bus bar 112.

By disposing the guiding groove 121 at the insulating plate 12, the battery module 1 provided by embodiments of the present application can adjust the altitude of the tab 111a as it passes through and facilitate the passage of the tab 111a.

In some embodiments, after the tab 111a is bended, the bending segment 111a2 can be connected to the bus bar 112, and face-to-face attachment fixing is formed between the bending segment 111a2 and the bus bar 112. Then there is no need to reserve a large space between the battery group 11 and the insulating plate 12 to meet the process requirements, which increases the energy density of the battery module 1. And the way of fact-to-face attachment can make the current more stable and also ensure an enough flow area.

With reference to FIG. 8, the insulating plate 12 includes a plurality of plate assemblies 122. With reference to FIG. 9, the adjacent plate assemblies 122 are connected through a connecting plate 123, and there is an obtuse first angle β between each plate assembly 122 and the connecting plate 123 connected thereto.

By providing the connecting plate 123, there is an obtuse angle between the plate assembly 122 and the connecting plate 123, and the sharp-angled portion between the plate assembly and the plate assembly in the related art is eliminated, which not only avoids damage to the battery group, but also increases the internal space of the battery module and increases the energy density of the battery module.

In some embodiments, each plate assembly includes a first plate 122a and a second plate 122b. The foregoing guiding groove 121 is disposed at a junction of the first plate 122a and the second plate 122b. The tabs 111a of the adjacent battery units 111 can pass through the junction of the first plate 122a and the second plate 122b at the same time, which makes the structure more compact.

As an optional implementation manner, there is an obtuse second angle α between the first plate 122a and the second plate 122b, the second angle α is disposed towards the battery group 11, and the foregoing guiding groove 121 is disposed at a vertex of the second angle α. By providing a certain angle between the first plate 122a and the second plate 122b, when the tab 111a prepares to pass through the guiding groove 121, a space circled by the first plate 122a and the second plate 122b can limit an active space of the tab 111a and avoid a short circuit caused by the tipping of the tab 111a.

There is an obtuse angle between the first plate 122a and the second plate 122b, which can make the entire insulating plate 12 tend to be more flat, thereby leaving a certain space for the expansion of the battery group 11. The gas generated after the battery group 11 is repeatedly charged make the battery group 11 expand, the foregoing structure can reserve space for gas expansion. At the same time, the insulating plate 12 occupies a small space, which increases the energy density of the battery module 1.

The foregoing connecting plate 123 may be integrally formed with the plate assembly 122, and the connecting plate 123 can transit and connect the adjacent two plate assemblies 122. If the two plate assemblies 122 are directly connected, then a sharp-edged structure is formed. After the connecting plate 123 is provided, the insulating plate 12 tends to be more flat, which further provides a space for the expansion of the battery group 11. And the insulating plate 12 occupies a smaller space, which increases the energy density of the battery module 1.

There are many ways to fix the bus bar 112 to the insulating plate 12. And one implementation manner is to provide a buckle 124 at one side of the insulating plate 12 away from the battery group 11, and the bus bar 112 is snap-fitted and fixed to the buckle 124. The bus bar 1112 may include a first bus bar and a second bus bar, where the first bus bar is a positive bus bar and the second bus bar is a negative bus bar. Of course, the first bus bar may also be provided as a negative bus bar and the second bus bar as a positive bus bar. The tab 111a includes a first tab 111b and a second tab 111c. The connecting segment 111a1 of each first tab 111b passes through the guiding groove 121 of the first insulating plate 126, and the connecting segment 111a1 of each second tab 111c passes through the guiding groove 121 of the second insulating plate 127. In the embodiment, the connecting segment 111a1 of each first tab 111b passes through the guiding groove 121 of the first insulating plate 126 and the connecting segments 111a1 of each second tab 111c passes through the guiding groove 121 of the second insulating plate 127. The insulating plate 12 may be provided with a plurality of guiding grooves 121. In this embodiment, eight battery units 111 are taken as an example. The first tab 111b of each adjacent battery unit 111 passes through the same guiding groove 121 on the first insulating plate 126. The first insulating plate 126 is provided with four guiding grooves 121, and the first tab 111b may be a positive tab. The second tab 111c of each adjacent battery cell 111 passes through the same guiding groove 121 on the second insulating plate 127. Four guiding grooves 121 may also be disposed on the second insulating plate 127, and the second tab 111c may be a negative tab.

As what is mentioned above, the bus bar 112 may include a first bus bar and a second bus bar. The bending segment 111a2 of each first tab 111b is fixed and connected to the first bus bar, and the bending segment 111a2 of each second tab 111c is fixed and connected to the second bus bar. The first bus bar may be a positive bus bar and extracted as a positive electrode after the battery module 1 is assembled; and the second bus bar may be a negative bus bar and extracted as a negative electrode after the battery module 1 is assembled.

In the embodiments shown in FIG. 2 and FIG. 3, the number of the first bus bar is three and all of which are disposed at one side connected to the first tab. Those skilled in the art may understand that the number of the first bus bar and the number of the second bus bar are not specifically limited, and can be determined according to the number of the battery unit 111 and the installation space.

As an optional implementation manner, the connecting segment 111a1 extends along the lengthwise direction (direction X) of the battery group 11, and the bending segment 111a2 extends along the widthwise direction (direction Y) of the battery group. Thus the connecting segment 111a1 and the bending segment 111a2 of the foregoing tab 111a tend to be substantially perpendicular to each other. After the tab 111a passes through the guiding groove 121, the connecting segment 111a1 is accommodated in the guiding groove 121, and the bending segment 111a2 is bent and connected to the bus bar 112. If the bending segment 111a2 tends to be perpendicular to the connecting section 111a1 after bending, the space between the insulating plate 12 and the lower box body 13 can be maximally saved, thereby increasing the energy density of the battery module 1.

In some embodiments, an inner wall of the lower box body 13 is provided with a slot 131, and all of the battery group 11, the insulating plate 12 and the bus bar 112 are disposed in the lower box body 13. Two ends of the insulating plate 12 are provided with an extending portion 125; and the extending portion 125 is snap-fitted and fixed to the slot 131. The two ends of the insulating plate 12 is snap-fitted to the slot 131 of the lower box body 13 by the extending portion 125, which increases the reliability of the insulating plate 12 connected to the inside of the lower box body 13.

The present application also provides an insulating plate, and the insulating plate is disposed between a bus bar and a battery group. The insulating plate includes a plurality of plate assemblies, the adjacent plate assemblies are connected through a connecting plate; and there is an obtuse first angle between each plate assembly and the connecting plate connected thereto; and the plate assembly includes a guiding groove, and each tab passes through the guiding groove and is fixed and connected to the bus bar.

The present application further provides a vehicle including a battery module, wherein the battery module includes a battery group and an insulating plate. The battery group includes a bus bar and a plurality of battery units, each battery unit comprises a tab; and the bus bar is fixed at one side of the insulating plate away from the battery group. The insulating plate includes a plurality of plate assemblies, the adjacent plate assemblies are connected through a connecting plate; and there is an obtuse first angle between each plate assembly and the connecting plate connected thereto. The plate assembly comprises a guiding groove, and each tab passes through the guiding groove and is fixed and connected to the bus bar.

The forgoing descriptions are merely optional embodiments of the present application, but are not intended to limit the present application. For those skilled in the art, the present application may have various amendments and modifications. Any modification, equivalent substitution, improvement or the like, made within the spirit and principle of the present application, shall fall within the protection scope of the present application.

What is claimed is:

1. A battery module, comprising: a battery group and an insulating plate;
    wherein the battery group comprises a bus bar and a plurality of battery units, each battery unit comprises a tab; and the bus bar is configured to be fixed at one side of the insulating plate away from the battery group;
    wherein the insulating plate comprises a plurality of plate assemblies, a plurality of the plate assemblies comprises adjacent a first plate assembly and a second assembly; the first plate assembly connects with the second plate assembly by a connecting plate; there is an obtuse first angle between the first plate assembly and the connecting plate connected thereto; and there is an obtuse first angle between the second plate assembly and the connecting plate connected thereto;
    each plate assembly comprises a first plate and a second plate; the second plate of the first plate assembly connects with the first plate of the second plate assembly by the connecting plate; the second plate of the first plate assembly and the first plate of the second plate assembly are bent set relative to the connecting plate respectively; the second plate of the first plate assembly, the first plate of the second plate assembly and the connecting plate enclose a groove;
    and the plate assembly comprises a guiding groove, and each tab is configured to pass through the guiding groove and be fixed and connected to the bus bar.

2. The battery module according to claim 1, wherein the guiding groove is disposed at a junction of the first plate and the second plate.

3. The battery module according to claim 1, wherein there is an obtuse second angle between the first plate and the second plate.

4. The battery module according to claim 1, wherein the tab comprises a connecting segment and a bending segment which are integrally formed;
    and the connecting segment is configured to pass through the guiding groove, and the bending segment is configured to be fixed and connected to the bus bar.

5. The battery module according to claim 4, wherein face-to-face attachment and fixing is formed between the bending segment and the bus bar.

6. The battery module according to claim 4, wherein the connecting segment extends along a lengthwise direction of the battery group;
    and the bending segment extends along a widthwise direction of the battery group.

7. The battery module according to claim 1, wherein a buckle is disposed at one side of the insulating plate away from the battery group;
    and the bus bar is configured to be snap-fitted and fixed to the buckle.

8. The battery module according to claim 1, wherein the insulating plate comprises a first insulating plate and a second insulating plate;
    the first insulating plate and the second insulating plate are disposed at two ends of the battery group along a lengthwise direction.

9. The battery module according to claim 8, wherein the tab comprises a first tab and a second tab;
    a connecting segment of each first tab is configured to pass through the guiding groove of the first insulating plate;

and a connecting segment of each second tab is configured to pass through the guiding groove of the second insulating plate.

10. The battery module according to claim 9, wherein the bus bar comprises a first bus bar and a second bus bar;

a bending segment of each first tab is configured to be fixed and connected to the first bus bar;

and a bending segment of each second tab is configured to be fixed and connected to the second bus bar.

11. The battery module according to claim 1, wherein the battery module further comprises a lower box body;

the battery group, the insulating plate and the bus bar are all disposed in the lower box body.

12. The battery module according to claim 11, wherein an inner wall of the lower box body is provided with a slot;

two ends of the insulating plate are provided with an extending portion; and the extending portion is configured to be snap-fitted and fixed to the slot.

13. The battery module according to claim 1, each plate assembly and the connecting plate connected thereto are integrally formed.

14. An insulating plate, wherein the insulating plate is disposed between a bus bar and a battery group, the insulating plate comprises a plurality of plate assemblies, a plurality of the plate assemblies comprises adjacent a first plate assembly and a second assembly; the first plate assembly connects with the second plate assembly by a connecting plate; there is an obtuse first angle between the first plate assembly and the connecting plate connected thereto; and there is an obtuse first angle between the second plate assembly and the connecting plate connected thereto;

each plate assembly comprises a first plate and a second plate; the second plate of the first plate assembly connects with the first plate of the second plate assembly by the connecting plate; the second plate of the first plate assembly and the first plate of the second plate assembly are bent set relative to the connecting plate respectively; the second plate of the first plate assembly, the first plate of the second plate assembly and the connecting plate enclose a groove;

and the plate assembly comprises a guiding groove, and each tab is configured to pass through the guiding groove and be fixed and connected to the bus bar.

15. The insulating plate according to claim 14, wherein there is an obtuse second angle between the first plate and the second plate.

16. The insulating plate according to claim 14, wherein a buckle which is configured to be snap-fitted and fixed to the bus bar is disposed at one side of the insulating plate away from the battery group.

17. The insulating plate according to claim 14, each plate assembly and the connecting plate connected thereto are integrally formed.

18. A vehicle, comprising a battery module, the battery module comprising:

a battery group and an insulating plate;

wherein the battery group comprises a bus bar and a plurality of battery units, each battery unit comprises a tab; and the bus bar is configured to be fixed at one side of the insulating plate away from the battery group;

wherein the insulating plate comprises a plurality of plate assemblies, a plurality of the plate assemblies comprises adjacent a first plate assembly and a second assembly; the first plate assembly connects with the second plate assembly by a connecting plate; there is an obtuse first angle between the first plate assembly and the connecting plate connected thereto; and there is an obtuse first angle between the second plate assembly and the connecting plate connected thereto;

each plate assembly comprises a first plate and a second plate; the second plate of the first plate assembly connects with the first plate of the second plate assembly by the connecting plate; the second plate of the first plate assembly and the first plate of the second plate assembly are bent set relative to the connecting plate respectively; the second plate of the first plate assembly, the first plate of the second plate assembly and the connecting plate enclose a groove;

and the plate assembly comprises a guiding groove, and each tab is configured to pass through the guiding groove and be fixed and connected to the bus bar.

19. The battery module according to claim 3, wherein the second angle is disposed towards the battery group, and the guiding groove is disposed at a vertex of the second angle.

20. The battery module according to claim 1, wherein a plurality of bus bars are disposed along a widthwise direction of the battery group; the guiding groove is set between two adjacent bus bars; each tab is configured to pass through the guiding groove and be fixed and connected to the one side of the bus bar away from the battery module.

* * * * *